June 17, 1941.  J. A. SPERRY  2,246,393
HANDLE CONSTRUCTION
Filed Nov. 7, 1940
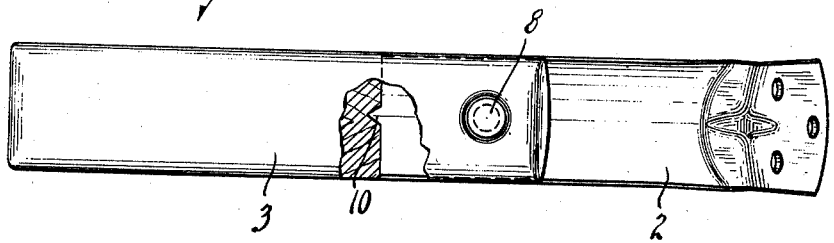
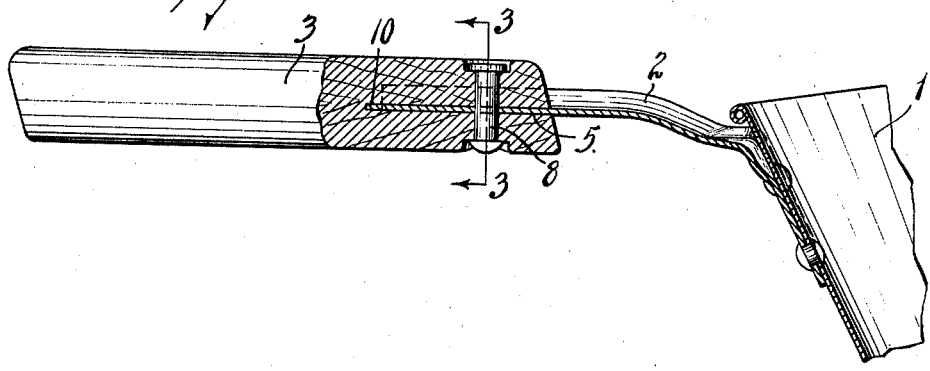
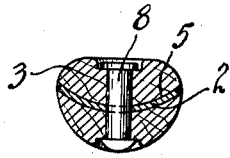
INVENTOR
JOHN A. SPERRY
BY
ATTORNEYS Patented June 17, 1941

2,246,393

UNITED STATES PATENT OFFICE 2,246,393

HANDLE CONSTRUCTION

John A. Sperry, Tallmadge, Ohio, assignor to The Baker McMillen Company, Akron, Ohio, a corporation of Ohio Application November 7, 1940, Serial No. 364,646

1 Claim. (Cl. 16—116)

The present invention relates to the manufacture of handles such as employed on saucepans, tools and other utensils where a wooden or composition handle, which for cooking utensils is a poor conductor of heat, is attached to the main body of the utensil by a bar or the like.

It is the object of the present invention to devise and perfect a handle of this type in which the handle will be securely attached to and mounted upon the extending bar or lug. Handles of this type have a tendency to work loose or shift upon the attachment, but the form shown will not become loose or detached except by actual destruction of the handle itself. The result is obtained by a very simple and effective combination of elements such as shown and described herein, it being understood that the invention is adaptable to all types of tools or utensils where a handle member is attached in a similar manner. It will also be understood that exact following of the specific construction is not essential and changes and modifications may be made within the scope of the invention as set forth in the appended claim.

In the drawing in which the best known and preferred form of the invention is illustrated:

Fig. 1 is a plan view of the improved handle, partly broken away to disclose the interior construction;

Fig. 2 is a side view of the invention as applied to the ordinary saucepan, the view being partially in section; and Fig. 3 is a section on the line 3—3 of Fig. 2.

In the form shown the body of the article is indicated by the fragment thereof as at 1, to which is riveted or otherwise secured the plate or extension 2 which is preferably formed as a sheet metal stamping. To assist in preventing the relative movement of the plate 2 and the body of the handle 3, the plate is arched or curved transversely and the end of the handle is provided with a longitudinally curved slot or kerf 5 extending from side to side of the handle and in which the curved portion of the plate is received. Through the plate and the body of the handle is located a pin or the like to hold the plate in place. As shown, this is preferably a rivet 8.

To anchor the plate in the handle so that relative movement of these parts is entirely prevented, an interlocking formation is provided between the end of the plate and the handle at the base of the slot. In the preferred form of the invention the inner end of the plate is provided with a tooth or tang 10. Where a wooden handle is employed, the plate is driven into position until the tooth is embedded in the body of the handle at the base of the slot. If the handle is made of a plastic or other moldable material, the recess to receive the tooth or projection 10 may be molded therein. One stout tooth will normally be found to be sufficient, but, if desired, more than one tooth or tang may be provided at the base or inner end of the attaching plate 2.

It will be seen that a very simple but very strong and secure attachment is provided between the plate and the handle with a single rivet. Rotation of the plate about the single rivet is prevented not only by the mating curved surfaces of the plate and handle, but also by the tooth or projection 10 which is embedded in the handle. This secures a firm and non-rotating connection with the use of only one rivet, and for this reason the handle is stronger than were the case if two or more rivets were employed. It will also be noted that the metal plate is the full width of the handle and extends from side to side thereof. This enables the manufacturer to use a full width plate and does not weaken the handle as in the case where the plate is received in a hole in the handle.

What is claimed is:

A handle construction comprising a handle body, a transversely curved attaching plate of substantially the same width as the body, said handle having a similarly curved slot extending through the body from side to side thereof in which the curved plate is fitted so that relative pivotal movement of the plate and the handle is prevented, a pin through the handle body and the attaching plate and a formation at the inner end of the plate to interlock the plate and the handle body.

JOHN A. SPERRY.